(12) United States Patent
Wolf (10) Patent No.: US 10,773,547 B2
(45) Date of Patent: Sep. 15, 2020

(54) REINFORCED VEHICLE WHEEL RIM AND FABRICATED VEHICLE WHEEL AND METHOD FOR PRODUCING THE SAME

(71) Applicant: Maxion Wheels U.S.A. LLC, Novi, MI (US)

(72) Inventor: Joseph W. Wolf, Novi, MI (US)

(73) Assignee: Maxion Wheels U.S.A. LLC, Novi, MI (US)

( * ) Notice: Subject to any disclaimer, the term of this patent is extended or adjusted under 35 U.S.C. 154(b) by 92 days.

(21) Appl. No.: 15/759,556

(22) PCT Filed: Sep. 14, 2016

(86) PCT No.: PCT/US2016/051604
§ 371 (c)(1),
(2) Date: Mar. 13, 2018

(87) PCT Pub. No.: WO2017/048761
PCT Pub. Date: Mar. 23, 2017

(65) Prior Publication Data
US 2019/0152255 A1    May 23, 2019

Related U.S. Application Data

(60) Provisional application No. 62/218,096, filed on Sep. 14, 2015.

(51) Int. Cl.
*B60B 21/12* (2006.01)
*B60B 3/04* (2006.01)
(Continued)

(52) U.S. Cl.
CPC .............. *B60B 21/12* (2013.01); *B60B 3/04* (2013.01); *B60B 21/023* (2013.01);
(Continued)

(58) Field of Classification Search
CPC ..... B60B 21/12; B60B 21/023; B60B 21/108; B60B 3/04; B60B 2900/311;
(Continued)

(56) References Cited

U.S. PATENT DOCUMENTS 4,173,992 A * 11/1979 Lejeune .................... B60B 5/02
152/381.3
2004/0066083 A1 * 4/2004 Tsihlas .................... B60B 21/12
301/6.91
(Continued)

OTHER PUBLICATIONS

PCT International Search Report and the Written Opinion, Application No. PCT/US2016/051604 filed Sep. 14, 2016, dated Dec. 7, 2016.
PCT International Preliminary Report on Patentability, Application No. PCT/US2016/051604 filed Sep. 14, 2016, dated Mar. 29, 2018.

*Primary Examiner* — S. Joseph Morano
*Assistant Examiner* — Jean W Charleston
(74) *Attorney, Agent, or Firm* — MacMillan, Sobanski & Todd, LLC (57) ABSTRACT

A vehicle wheel rim having at least an inboard tire bead seat retaining flange, an inboard tire bead seat, a well and an outboard tire bead seat. A reinforcing tape applied to at least a portion of one of an inner surface and/or an outer surface of the inboard tire bead seat retaining flange, the inboard tire bead seat, the well and the outboard tire bead seat.

27 Claims, 4 Drawing Sheets (51) Int. Cl.
*B60B 21/10* (2006.01)
*B60B 21/02* (2006.01)
*B60B 25/22* (2006.01)

(52) U.S. Cl.
CPC .......... *B60B 21/108* (2013.01); *B60B 21/102* (2013.01); *B60B 21/104* (2013.01); *B60B 25/22* (2013.01); *B60B 2310/30* (2013.01); *B60B 2360/102* (2013.01); *B60B 2900/311* (2013.01)

(58) Field of Classification Search
CPC .......... B60B 2360/102; B60B 2310/30; B60B 21/104; B60B 25/22; B60B 21/102
USPC ........................................ 301/95.107, 63.106
See application file for complete search history.

(56) References Cited

U.S. PATENT DOCUMENTS

| | | | |
|---|---|---|---|
| 2007/0215266 A1* | 9/2007 | Shimizu ............. | B29D 30/0681 156/112 |
| 2010/0237685 A1* | 9/2010 | Yee ........................... | B60B 1/08 301/37.43 |
| 2013/0049443 A1* | 2/2013 | He ........................... | B60B 5/02 301/64.703 |
| 2013/0187440 A1* | 7/2013 | Coleman ................... | B60B 3/02 301/63.104 |

* cited by examiner

REINFORCED VEHICLE WHEEL RIM AND FABRICATED VEHICLE WHEEL AND METHOD FOR PRODUCING THE SAME

CROSS-REFERENCE TO RELATED APPLICATIONS

This application claims priority to U.S. Provisional Application Ser. No. 62/218,096 filed Sep. 14, 2015, the disclosure of which is incorporated herein by reference in entirety.

BACKGROUND OF THE INVENTION

The present invention relates generally to vehicle wheel assemblies and in particular to an improved reinforced vehicle wheel rim and method for producing the same and a fabricated vehicle wheel including such a reinforced vehicle wheel rim and method for producing the same.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

A conventional full face fabricated vehicle wheel is distinguished from other types of fabricated wheels by having a one-piece wheel disc construction. In particular, the full face wheel includes a "full face" disc and a "partial" rim. The full face disc can be formed, cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

SUMMARY OF THE INVENTION

The present invention relates to an improved reinforced vehicle wheel rim and method for producing the same and a fabricated vehicle wheel including such a reinforced vehicle wheel rim and method for producing the same.

According to an embodiment, the vehicle wheel rim may comprise, individually and/or in combination, one or more of the following features: a steel wheel rim including at least an inboard tire bead seat retaining flange, an inboard tire bead seat, a well and an outboard tire bead seat; and a reinforcing tape applied to at least a portion of one of an inner surface and/or an outer surface of the inboard tire bead seat retaining flange, the inboard tire bead seat, the well and the outboard tire bead seat.

According to this embodiment, the reinforcing tape may be applied continuously to the at least a portion of one of the inner surface and/or the outer surface of the inboard tire bead seat retaining flange, the inboard tire bead seat, the well and the outboard tire bead seat.

According to this embodiment, the reinforcing tape may be applied permanently to the at least a portion of one of an inner surface and/or an outer surface of the inboard tire bead seat retaining flange, the inboard tire bead seat, the well and the outboard tire bead seat.

According to this embodiment, the reinforcing tape may be applied in one or more recesses provided in the at least a portion of one of the inner surface and/or the outer surface of the wheel rim, whereby the reinforcing tape is substantially flush with the adjacent wheel surface.

According to this embodiment, at least one hole is formed in at least one portion of the wheel rim and the reinforcing tape is applied to cover and close the at least one hole.

According to this embodiment, the reinforcing tape may be applied to at least two portions of the inner surface and/or the outer surface of the inboard tire bead seat retaining flange, the inboard tire bead seat, the well and the outboard tire bead seat.

According to this embodiment, the reinforcing tape may be applied to the least two portions of the inner surface and/or the outer surface of the inboard tire bead seat retaining flange, the inboard tire bead seat, the well and the outboard tire bead seat has generally the same thickness.

According to this embodiment, the reinforcing tape may be applied to the least two portions of the inner surface and/or the outer surface of the inboard tire bead seat retaining flange, the inboard tire bead seat, the well and the outboard tire bead seat has different thicknesses.

According to this embodiment, the steel wheel rim may be configured to be secured to a wheel disc to produce a fabricated vehicle wheel.

According to this embodiment, the vehicle wheel may be one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

According to an embodiment, the vehicle wheel rim may comprise, individually and/or in combination, one or more of the following features: a wheel disc; a steel wheel rim secured to the wheel disc and including at least an inboard tire bead seat retaining flange, an inboard tire bead seat, a well and an outboard tire bead seat; and a reinforcing tape applied to at least a portion of one of an inner surface and/or an outer surface of the inboard tire bead seat retaining flange, the inboard tire bead seat, the well and the outboard tire bead seat.

According to this embodiment, wherein the reinforcing tape may be applied continuously to the at least a portion of one of the inner surface and/or the outer surface of the inboard tire bead seat retaining flange, the inboard tire bead seat, the well and the outboard tire bead seat.

According to this embodiment, the reinforcing tape may be applied permanently to the at least a portion of one of an inner surface and/or an outer surface of the inboard tire bead seat retaining flange, the inboard tire bead seat, the well and the outboard tire bead seat.

According to this embodiment, the reinforcing tape may be applied in one or more recesses provided in the at least a portion of one of the inner surface and/or the outer surface of the wheel rim, whereby the reinforcing tape is substantially flush with the adjacent wheel surface.

According to this embodiment, at least one hole is formed in at least one portion of the wheel rim and the reinforcing tape is applied to cover and close the at least one hole.

According to this embodiment, the reinforcing tape may be applied to at least two portions of the inner surface and/or the outer surface of the inboard tire bead seat retaining flange, the inboard tire bead seat, the well and the outboard tire bead seat.

According to this embodiment, the reinforcing tape may be applied to the least two portions of the inner surface and/or the outer surface of the inboard tire bead seat retaining flange, the inboard tire bead seat, the well and the outboard tire bead seat has generally the same thickness.

According to this embodiment, the reinforcing tape may be applied to the least two portions of the inner surface and/or the outer surface of the inboard tire bead seat retaining flange, the inboard tire bead seat, the well and the outboard tire bead seat has different thicknesses.

According to this embodiment, the steel wheel rim may be configured to be secured to a wheel disc to produce a fabricated vehicle wheel.

According to this embodiment, the vehicle wheel may be one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

According to an embodiment, a method for producing a wheel rim may comprise, individually and/or in combination, one or more of the following features: providing a steel wheel rim including at least an inboard tire bead seat retaining flange, an inboard tire bead seat, a well and an outboard tire bead seat; and applying a reinforcing tape to at least a portion of one of an inner surface and/or an outer surface of the inboard tire bead seat retaining flange, the inboard tire bead seat, the well and the outboard tire bead seat.

According to this embodiment, the reinforcing tape may be applied continuously to the at least a portion of one of the inner surface and/or the outer surface of the inboard tire bead seat retaining flange, the inboard tire bead seat, the well and the outboard tire bead seat.

According to this embodiment, the reinforcing tape may be applied permanently to the at least a portion of one of an inner surface and/or an outer surface of the inboard tire bead seat retaining flange, the inboard tire bead seat, the well and the outboard tire bead seat.

According to this embodiment, at least one hole is formed in at least one portion of the wheel rim and the reinforcing tape is applied to cover and close the at least one hole.

According to this embodiment, the reinforcing tape may be applied in one or more recesses provided in the at least a portion of one of the inner surface and/or the outer surface of the wheel rim, whereby the reinforcing tape is substantially flush with the adjacent wheel surface.

According to this embodiment, the reinforcing tape may be applied to at least two portions of the inner surface and/or the outer surface of the inboard tire bead seat retaining flange, the inboard tire bead seat, the well and the outboard tire bead seat.

According to this embodiment, the reinforcing tape may be applied to the least two portions of the inner surface and/or the outer surface of the inboard tire bead seat retaining flange, the inboard tire bead seat, the well and the outboard tire bead seat has generally the same thickness.

According to this embodiment, the reinforcing tape may be applied to the least two portions of the inner surface and/or the outer surface of the inboard tire bead seat retaining flange, the inboard tire bead seat, the well and the outboard tire bead seat has different thicknesses.

According to this embodiment, the steel wheel rim may be secured to a wheel disc to produce a fabricated vehicle wheel.

According to this embodiment, the vehicle wheel may be one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

Other advantages of this invention will become apparent to those skilled in the art from the following detailed description of the invention and preferred embodiments, when read in light of the accompanying drawings.

DETAILED DESCRIPTION OF THE INVENTION

Figure 1:
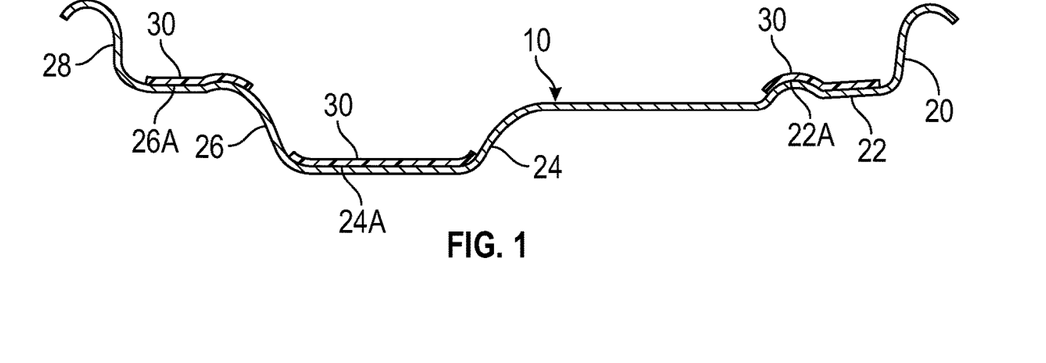
FIGS. 1-3 and 1A are views of a first embodiment of a wheel rim and/or vehicle wheel including such a wheel rim, in accordance with this invention.
Figures 1A, 2:
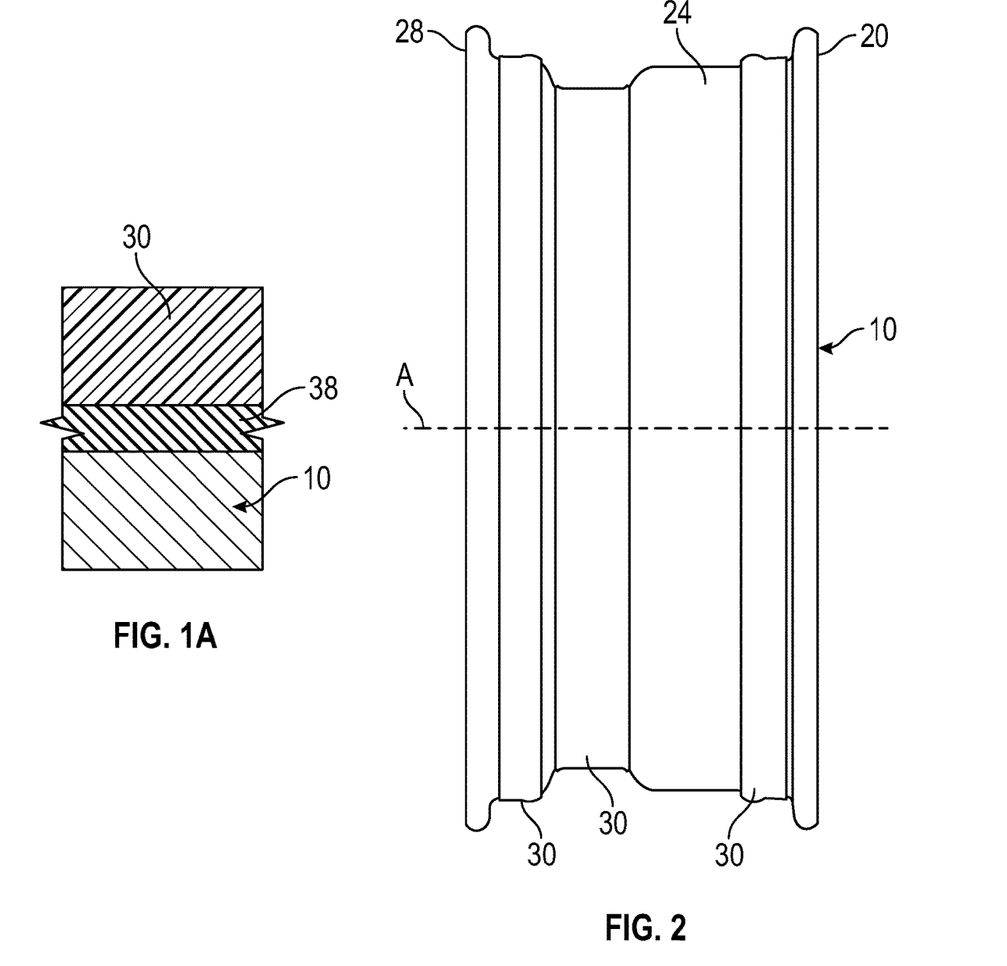
Figure 3:
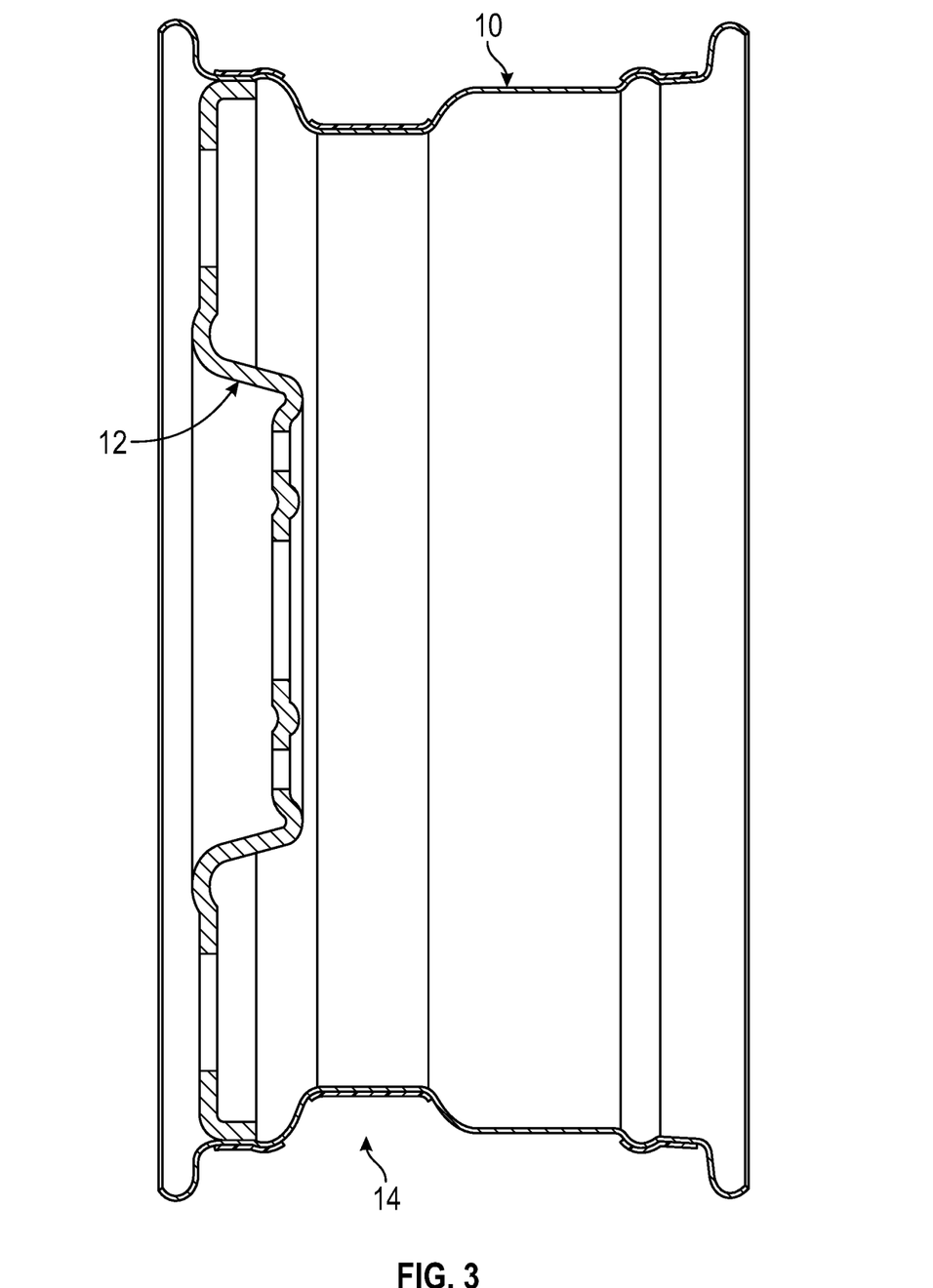

Referring now to the drawings, there is illustrated in FIGS. 1 and 2 a first embodiment of a wheel rim, indicated generally at 10, in accordance with the present invention. The wheel rim 10 of this invention is preferably a steel wheel rim and is illustrated as being configured for use in connection with a two or more piece "fabricated" vehicle wheel having the wheel rim 10 configured to be secured by suitable means to a separate one or more piece wheel disc, such as shown for example generally at 12 in FIG. 3 so as to produce a fabricated vehicle wheel, indicated generally at 14 in FIG. 3. In the illustrated embodiment, the wheel 14 is a steel wheel and the disc 12 is formed from steel and secured to the wheel rim 10 by welding. The wheel disc 12 can be formed from any suitable material(s) or combinations thereof, such as for example, steel, aluminum, carbon fiber.

In the illustrated embodiment, the wheel rim 10 is illustrated as being adapted for use in producing a fabricated bead seat attached vehicle wheel 14. However, it will be appreciated that the invention can be used in conjunction with other types of fabricated vehicle wheel constructions, if so desired. For example, as shown herein or with modifications thereto, the present invention may be used in connection with other types of fabricated vehicle wheels, such as for example in a "full face" type of vehicle wheel, such as shown in FIG. 5A of U.S. Pat. No. 5,533,261 to Kemmerer, in a "well attached" type of vehicle wheel, such as shown for example in FIG. 3 of U.S. Pat. No. 5,188,429 to Heck et al., a "bimetal" type of vehicle wheel construction including an aluminum disc and a steel rim, such as shown for example in U.S. Pat. No. 5,421,642 to Wei et al., a "modular wheel" type of construction, such as shown for example in U.S. Pat. No. 5,360,261 to Archibald et al., and a "euroflange wheel" type of constructions, such as shown in U.S. Pat. No. 5,564,792 to Archibald, the disclosures of each of these patents incorporated by reference in entirety herein.

As shown in FIGS. 1 and 2, the wheel rim 10 defines a wheel axis A and includes an inboard bead seat retaining flange 20, an inboard tire bead seat 22, a well 24, an outboard tire bead seat 26 and an outboard tire bead seat retaining flange 28. In the illustrated embodiment the wheel rim 10 is illustrated as having a generally uniform thickness. Alternatively, the shape, configuration, structure and/or material of the wheel rim 10 can be other than illustrated and described if so desired.

In the illustrated embodiment, a "reinforcing" tape and/or similar "reinforcing" material 30, such as for example a fiber-reinforced plastic tape (FRP tape) and/or a carbon fiber reinforced plastic tape (CFRP tape), is selectively applied to at least one or more selected surfaces and/or areas of the wheel rim 10; however, other suitable "reinforcing" materials and/or tapes may be used so long as they allow thinner wheel rim section(s) and provide the necessary support thereof. The tape 30 can be applied by any desired method, such as for example by a self-adhesive tape method, by a suitable adhesive or any other suitable method. Preferably the material 30 is permanently attached to the wheel rim 10 by the selected method. Alternatively, the material 30 could be attached to the wheel rim 10 by a method which would enable the material 30 to be removed if so desired. As shown in FIG. 1A, which is a view through a section of the wheel rim 10 including the tape 30, an adhesive 38 (which can be part of the tape 30 or separate from the tape 30 and preferably applied to the inner surface of the tape 30, an outer surface of the associated portion of the wheel rim 30 or both, if so desired), is interposed between an inner surface of the tape 30 and an outer surface of the associated section of the wheel rim 10. In the illustrated embodiment, the adhesive 38 is preferably part of a self-adhesive tape 30.

In the illustrated embodiment, the tape 30 has a generally uniform thickness is applied to a portion of an outer surface 22A of the inboard tire bead seat 22, a portion of an outer surface 24A of the well 24, and a portion of an outer surface 26A of the outboard tire bead seat 26. In the illustrated embodiment, the material 30 is applied continuously (i.e., 360 degree), around the selected surfaces of the wheel rim 10. If desired, the material 30 may be applied non-continuously around the selected surfaces of the wheel rim 10. Alternatively, the shape, configuration, structure, material, application and/or location(s) of the tape 30 can be other than illustrated and described if so desired.

Figure 4:
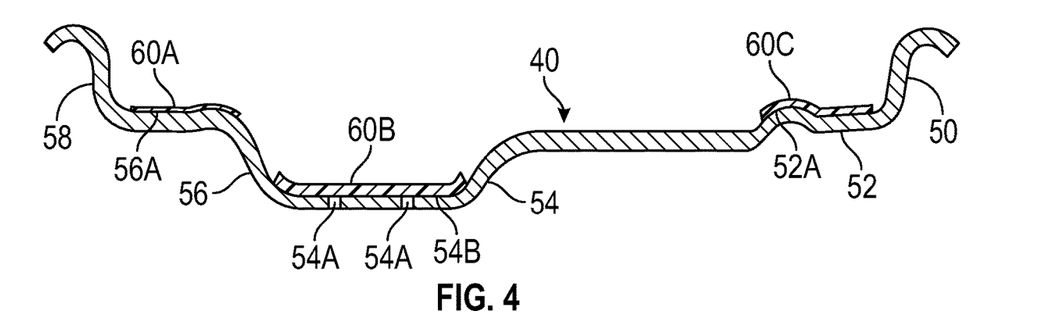
FIG. 4-5 are views of a second embodiment of a wheel rim and/or vehicle wheel including such a wheel rim, in accordance with this invention.
Figure 5:
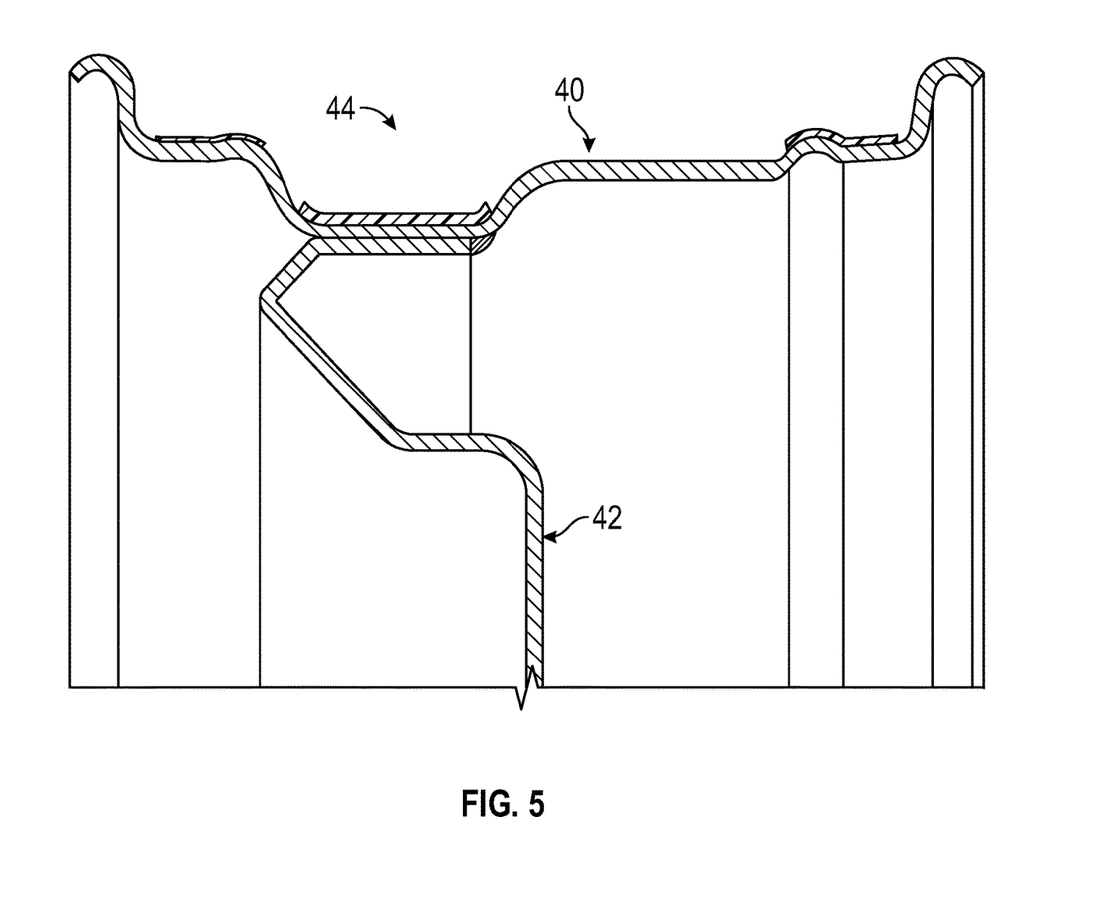

Referring now to FIG. 4, there is illustrated a second embodiment of a wheel rim, indicated generally at 40, in accordance with the present invention. The wheel rim 40 is preferably a steel wheel rim and is illustrated as being configured for use in connection with a two or more piece "fabricated" vehicle wheel having the wheel rim 40 configured to be secured by suitable means to a separate one or more piece wheel disc, such as shown for example generally at 42 in FIG. 5 so as to produce a fabricated well attached vehicle wheel, indicated generally at 44 in FIG. 5. In the illustrated embodiment, the wheel 44 is a steel wheel and the disc 42 is formed from steel and secured to the wheel rim 40 by welding. The wheel disc 42 can be formed from any suitable material(s) or combinations thereof, such as for example, steel, aluminum, carbon fiber.

As shown in FIG. 4, the wheel rim 40 defines a wheel axis (not shown), and includes an inboard bead seat retaining flange 50, an inboard tire bead seat 52, a well 54, an outboard tire bead seat 56 and an outboard tire bead seat retaining flange 58. In the illustrated embodiment the wheel rim 10 is illustrated as having a non-uniform or varying thickness. Also, in this embodiment one or more "lightener" holes or openings are provided in one or more of the sections of the wheel rim 40 and such holes are covered or closed by the tape. In the illustrated embodiment, a plurality of holes 54A are provided in the well 54 of the wheel rim 40 and are covered and "sealed" by the tape 60B. Depending on the particular size of the wheel rim 40, the number, location and/or size of the holes 54A may be other than illustrated. For example, on a commercial wheel rim the size of the holes may be several inches in diameter. Alternatively, the shape, configuration, structure and/or material of the wheel rim 40 can be other than illustrated and described if so desired. Also, in addition to being covered and sealed by the tape, one or more of the holes 54A may also be sealed with a suitable sealing material (not shown), which is disposed within the holes 54A.

In the illustrated embodiment, a reinforcing tape and/or similar reinforcing material 60A-60C, such as for example a fiber-reinforced plastic tape (FRP tape) and/or a carbon fiber reinforced plastic tape (CFRP tape), is selectively applied to at least one or more selected surfaces and/or areas of the wheel rim 40; however, other suitable "reinforcing" materials and/or tapes may be used so long as they allow thinner wheel rim section(s) and provide the necessary support thereof. The material 60A-60C can be applied by any desired method, such as for example by a self-adhesive tape method, by a suitable adhesive or any other suitable method. Preferably the material 60A-60C is permanently attached to the wheel rim 40 by the selected method. Alternatively, the material 60A-60C could be attached to the wheel rim 40 by a method which would enable the material 60A-60C to be removed if so desired.

In the illustrated embodiment, the tape 60A-60C are of different generally uniform thicknesses with tape 60A being the thinnest and tape 60B being the thickest. The tape 60C is applied to a portion of an outer surface 52A of the inboard tire bead seat 52, the tape 60B is applied to a portion of an outer surface 54B of the well 54, and the tape 60A is applied to a portion of an outer surface 56A of the outboard tire bead seat 56. In the illustrated embodiment, the material 60A-60C is applied continuously (i.e., 360 degree), around the selected surfaces of the wheel rim 40. If desired, the material 60A-60C may be applied non-continuously around the selected surfaces of the wheel rim 40. Alternatively, the shape, configuration, structure, material, application and/or location(s) of the tape 60A-60C can be other than illustrated and described if so desired.

Figure 6:
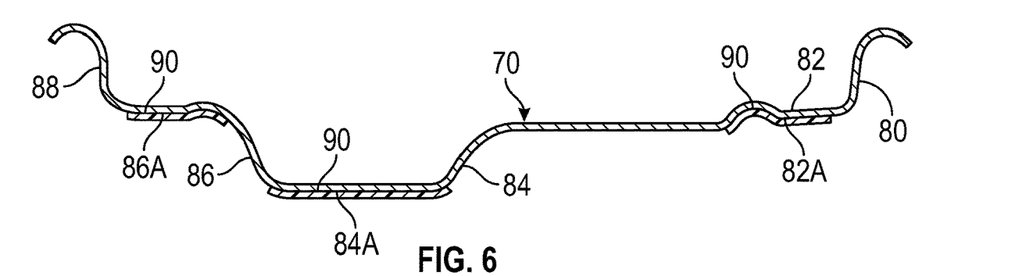
FIG. 6 is a view of a third embodiment of a wheel rim in accordance with this invention.

Referring now to FIG. 6, there is illustrated a third embodiment of a wheel rim, indicated generally at 70, in accordance with the present invention. The wheel rim 70 is preferably a steel wheel rim and is illustrated as being configured for use in connection with a two or more piece "fabricated" vehicle wheel having the wheel rim 70 configured to be secured by suitable means to a separate one or more piece wheel disc (such as disc 12 or 42 shown above), so as to produce a fabricated vehicle wheel (such as wheel 14 or 44 shown above). In the illustrated embodiment, the associated wheel can be a steel wheel and the disc can be formed from steel and secured to the wheel rim 70 by welding.

As shown in FIG. 6, the wheel rim 70 defines a wheel axis (not shown), and includes an inboard bead seat retaining flange 80, an inboard tire bead seat 82, a well 84, an outboard tire bead seat 86 and an outboard tire bead seat retaining flange 88. In the illustrated embodiment the wheel rim 70 is illustrated as having a non-uniform or varying thickness. Alternatively, the shape, configuration, structure and/or material of the wheel rim 70 can be other than illustrated and described if so desired.

In the illustrated embodiment, a reinforcing tape and/or similar reinforcing material 90, such as for example a fiber-reinforced plastic tape (FRP tape) and/or a carbon fiber reinforced plastic tape (CFRP tape), is selectively applied to at least one or more selected surfaces and/or areas of the wheel rim 70. The material 90 can be applied by any desired method, such as for example by a self-adhesive tape method, by a suitable adhesive or any other suitable method. Preferably the material 90 is permanently attached to the wheel rim 70 by the selected method. Alternatively, the material 90 could be attached to the wheel rim 70 by a method which would enable the material 90 to be removed if so desired.

In the illustrated embodiment, the tape 90 is if a generally uniform thickness and is applied to a portion of an inner surface 82A of the inboard tire bead seat 82, a portion of an inner surface 84A of the well 84, and a portion of an inner surface 86A of the outboard tire bead seat 86. In the illustrated embodiment, the material 90 is applied continuously (i.e., 360 degree), around the selected surfaces of the wheel rim 70. If desired, the material 90 may be applied non-continuously around the selected surfaces of the wheel rim 70. Alternatively, the shape, configuration, structure, material, application and/or location(s) of the tape 90 can be other than illustrated and described if so desired.

Figure 7:
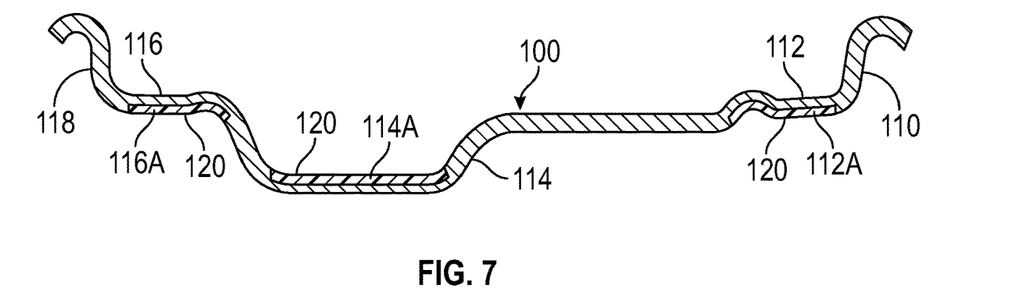
FIGS. 7-8 are views of a fourth embodiment of a wheel rim and/or vehicle wheel including such a wheel rim, in accordance with this invention.
Figure 8:
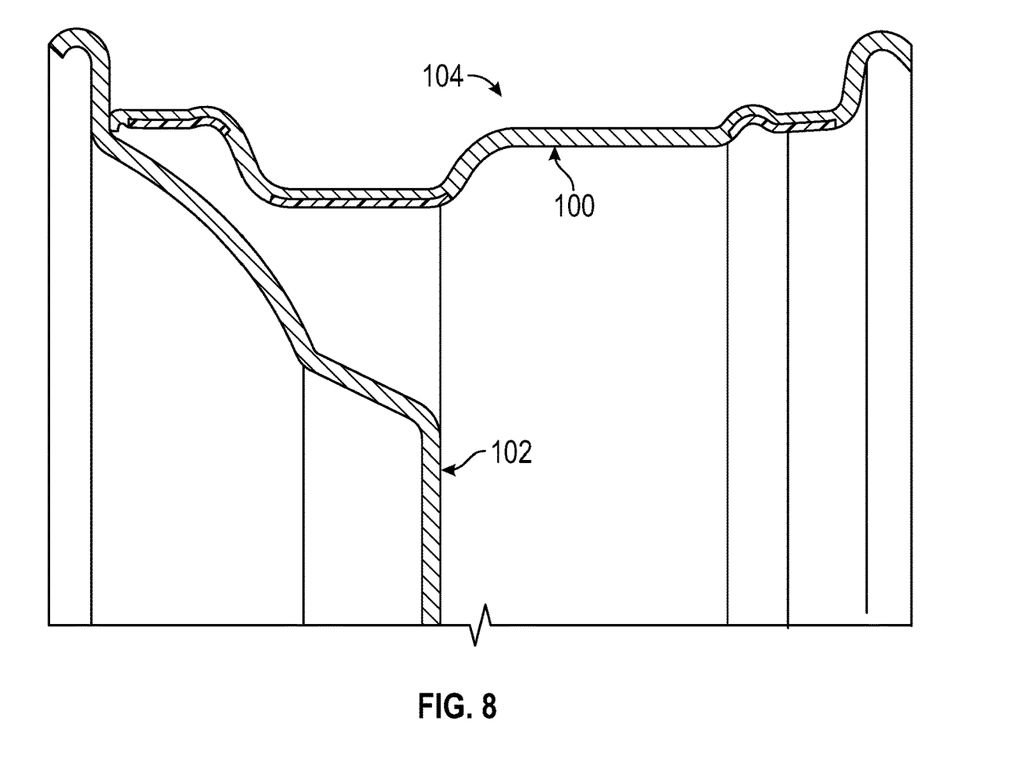

Referring now to FIG. 7, there is illustrated a fourth embodiment of a wheel rim, indicated generally at 100, in accordance with the present invention. The wheel rim 100 is preferably a steel wheel rim and is illustrated as being configured to be secured by suitable means to a separate one or more piece wheel disc, such as shown for example generally at 102 in FIG. 8 so as to produce a fabricated vehicle wheel, indicated generally at 104 in FIG. 8. In the illustrated embodiment, the wheel 104 is a steel wheel and the disc 102 is formed from steel and secured to the wheel rim 100 by welding. The wheel disc 102 can be formed from any suitable material(s) or combinations thereof, such as for example, steel, aluminum, carbon fiber.

As shown in FIG. 7, the wheel rim 100 defines a wheel axis (not shown), and includes an inboard bead seat retaining flange 110, an inboard tire bead seat 112, a well 114, an outboard tire bead seat 116 and an outboard tire bead seat retaining flange 118. In the illustrated embodiment the wheel rim 100 is illustrated as having a generally non-uniform or varying thickness. Alternatively, the shape, configuration, structure and/or material of the wheel rim 100 can be other than illustrated and described if so desired.

In the illustrated embodiment, a reinforcing tape and/or similar reinforcing material 120, such as for example a fiber-reinforced plastic tape (FRP tape) and/or a carbon fiber reinforced plastic tape (CFRP tape), is selectively applied to at least one or more selected surfaces and/or areas of the wheel rim 100. The material 120 can be applied by any desired method, such as for example by a self-adhesive tape method, by a suitable adhesive or any other suitable method. Preferably the material 120 is permanently attached to the wheel rim 100 by the selected method. Alternatively, the material 120 could be attached to the wheel rim 100 by a method which would enable the material 120 to be removed if so desired.

In the illustrated embodiment, the tape 120 is if a generally uniform thickness and is applied in a recess or pocket 112A provided in a portion of an outer surface of the inboard tire bead seat 122, in a recess or pocket 114A provided in a portion of an inner surface of the well 114, and in a recess or pocket 116A provided in a portion of an outer surface of the outboard tire bead seat 116. In the illustrated embodiment, the material 130 is applied continuously (i.e., 360 degree), around the selected surfaces of the wheel rim 100. If desired, the material 130 may be applied non-continuously around the selected surfaces of the wheel rim 70. As can be seen in FIG. 7, the depth of the pockets 112A-116A is preferably selected so that the associated outer surface of the tape 130 is substantially flush with the adjacent inner/outer surfaces of the wheel rim 100. Alternatively, the shape, configuration, structure, material, application and/or location(s) of the tape 130 can be other than illustrated and described if so desired.

One potential or realized advantage of the present invention is that the associated wheel rim 10, 40, 70 and 100 is "thinner"—at least in selected portion(s) thereof due to selective use of the material 30, 60A-60C, 90 and 130, respectively—compared to a standard conventional all steel wheel rim for the same load application. Thus, the wheel rim 10, 40, 70 and 100 reduces the overall weight of the particular finished vehicle wheel utilizing such wheel rim, compared to a standard conventional all vehicle wheel, utilizing such a standard conventional steel wheel rim, for the same load application. Also, the steel wheel rim used can be of a constant thickness or of a variable thickness as determined by known methods, such as finite element analysis (FEA). Similarly, the thickness of the reinforcing tape may vary across the rim profile or be constant. Preferably, the reinforcing tape may be selectively placed so that in fact some areas of the wheel rim may not get any reinforcing tape. The reinforcing tape returns the necessary strength and stiffness to carry the load, but at a much lower weight.

The principle and mode of operation of this invention have been described in its various embodiments. However, it should be noted that this invention may be practiced otherwise than as specifically illustrated and described without departing from its scope.

What is claimed is:

1. A vehicle wheel rim comprising:
    a steel wheel rim including at least an inboard tire bead seat retaining flange, an inboard tire bead seat, a well and an outboard tire bead seat; and
    a reinforcing tape applied to at least a portion of one of an inner surface and/or an outer surface of the inboard tire bead seat retaining flange, the inboard tire bead seat, the well and the outboard tire bead seat;
    wherein the reinforcing tape is applied in one or more recesses provided in the at least a portion of one of the inner surface and/or the outer surface of the wheel rim, whereby the reinforcing tape is substantially flush with the adjacent wheel surface.

2. The vehicle wheel rim of claim 1, wherein the reinforcing tape is applied continuously to the at least a portion of one of the inner surface and/or the outer surface of the inboard tire bead seat retaining flange, the inboard tire bead seat, the well and the outboard tire bead seat.

3. The vehicle wheel rim of claim 1, wherein the reinforcing tape is applied permanently to the at least a portion of one of an inner surface and/or an outer surface of the inboard tire bead seat retaining flange, the inboard tire bead seat, the well and the outboard tire bead seat.

4. The vehicle wheel rim of claim 1, wherein at least one hole is formed in at least one portion of the wheel rim and the reinforcing tape is applied to cover and close the at least one hole.

5. The vehicle wheel rim of claim 1, wherein the reinforcing tape is applied to at least two portions of the inner surface and/or the outer surface of the inboard tire bead seat retaining flange, the inboard tire bead seat, the well and the outboard tire bead seat.

6. The vehicle wheel rim of claim 5, wherein the reinforcing tape applied to the least two portions of the inner surface and/or the outer surface of the inboard tire bead seat retaining flange, the inboard tire bead seat, the well and the outboard tire bead seat has generally the same thickness.

7. The vehicle wheel rim of claim 1, wherein the reinforcing tape applied to the least two portions of the inner surface and/or the outer surface of the inboard tire bead seat retaining flange, the inboard tire bead seat, the well and the outboard tire bead seat has different thicknesses.

8. The vehicle wheel rim of claim 1, wherein the steel wheel rim is configured to be secured to a wheel disc to produce a fabricated vehicle wheel.

9. The vehicle wheel rim of claim 8, wherein the vehicle wheel is one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

10. A vehicle wheel comprising:
a wheel disc;
a steel wheel rim secured to the wheel disc and including at least an inboard tire bead seat retaining flange, an inboard tire bead seat, a well and an outboard tire bead seat; and
a reinforcing tape applied to at least a portion of one of an inner surface and/or an outer surface of the inboard tire bead seat retaining flange, the inboard tire bead seat, the well and the outboard tire bead seat;
wherein the reinforcing tape is applied in one or more recesses provided in the at least a portion of one of the inner surface and/or the outer surface of the wheel rim, whereby the reinforcing tape is substantially flush with the adjacent wheel surface.

11. The vehicle wheel of claim 10, wherein the reinforcing tape is applied continuously to the at least a portion of one of the inner surface and/or the outer surface of the inboard tire bead seat retaining flange, the inboard tire bead seat, the well and the outboard tire bead seat.

12. The vehicle wheel of claim 10, wherein the reinforcing tape is applied permanently to the at least a portion of one of an inner surface and/or an outer surface of the inboard tire bead seat retaining flange, the inboard tire bead seat, the well and the outboard tire bead seat.

13. The vehicle wheel rim of claim 10, wherein at least one hole is formed in at least one portion of the wheel rim and the reinforcing tape is applied to cover and close the at least one hole.

14. The vehicle wheel of claim 10, wherein the reinforcing tape is applied to at least two portions of the inner surface and/or the outer surface of the inboard tire bead seat retaining flange, the inboard tire bead seat, the well and the outboard tire bead seat.

15. The vehicle wheel of claim 14, wherein the reinforcing tape applied to the least two portions of the inner surface and/or the outer surface of the inboard tire bead seat retaining flange, the inboard tire bead seat, the well and the outboard tire bead seat has generally the same thickness.

16. The vehicle wheel of claim 10, wherein the reinforcing tape applied to the least two portions of the inner surface and/or the outer surface of the inboard tire bead seat retaining flange, the inboard tire bead seat, the well and the outboard tire bead seat has different thicknesses.

17. The vehicle wheel of claim 10, wherein the steel wheel rim is configured to be secured to a wheel disc to produce a fabricated vehicle wheel.

18. The vehicle wheel of claim 10, wherein the vehicle wheel is one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

19. A method for producing a vehicle wheel rim comprising the steps of:
providing a steel wheel rim including at least an inboard tire bead seat retaining flange, an inboard tire bead seat, a well and an outboard tire bead seat; and
applying a reinforcing tape to at least a portion of one of an inner surface and/or an outer surface of the inboard tire bead seat retaining flange, the inboard tire bead seat, the well and the outboard tire bead seat;
wherein the reinforcing tape is applied in one or more recesses provided in the at least a portion of one of the inner surface and/or the outer surface of the wheel rim, whereby the reinforcing tape is substantially flush with the adjacent wheel surface.

20. The method of claim 19, wherein the reinforcing tape is applied continuously to the at least a portion of one of the inner surface and/or the outer surface of the inboard tire bead seat retaining flange, the inboard tire bead seat, the well and the outboard tire bead seat.

21. The method of claim 19, wherein the reinforcing tape is applied permanently to the at least a portion of one of an inner surface and/or an outer surface of the inboard tire bead seat retaining flange, the inboard tire bead seat, the well and the outboard tire bead seat.

22. The vehicle wheel rim of claim 19, wherein at least one hole is formed in at least one portion of the wheel rim and the reinforcing tape is applied to cover and close the at least one hole.

23. The method of claim 19, wherein the reinforcing tape is applied to at least two portions of the inner surface and/or the outer surface of the inboard tire bead seat retaining flange, the inboard tire bead seat, the well and the outboard tire bead seat.

24. The method of claim 23, wherein the reinforcing tape applied to the least two portions of the inner surface and/or the outer surface of the inboard tire bead seat retaining flange, the inboard tire bead seat, the well and the outboard tire bead seat has generally the same thickness.

25. The method of claim 19, wherein the reinforcing tape applied to the least two portions of the inner surface and/or the outer surface of the inboard tire bead seat retaining flange, the inboard tire bead seat, the well and the outboard tire bead seat has different thicknesses.

26. The method of claim 19, and further including the step of securing the steel wheel rim to a wheel disc to produce a fabricated vehicle wheel.

27. The method of claim 26, wherein the vehicle wheel is one of a bead seat attached fabricated vehicle wheel, a well attached fabricated vehicle wheel, a full face fabricated vehicle wheel, a bimetal type of fabricated vehicle wheel, a modular type of fabricated vehicle wheel and a euroflange type of fabricated vehicle wheel.

* * * * *